United States Patent
Heeger et al.

(10) Patent No.: US 11,191,253 B2
(45) Date of Patent: Dec. 7, 2021

(54) VERIFICATION PROCESS AND SYSTEM FOR INFORMATION RELATING TO PETS OR SUPPORT ANIMALS

(71) Applicants: Brandon Heeger, Avon, IN (US); Robert Dickison, Dayton, OH (US)

(72) Inventors: Brandon Heeger, Avon, IN (US); Robert Dickison, Dayton, OH (US)

(*) Notice: Subject to any disclaimer, the term of this patent is extended or adjusted under 35 U.S.C. 154(b) by 0 days.

(21) Appl. No.: 16/440,068

(22) Filed: Jun. 13, 2019

(65) Prior Publication Data

US 2019/0380305 A1    Dec. 19, 2019

Related U.S. Application Data

(60) Provisional application No. 62/684,245, filed on Jun. 13, 2018.

(51) Int. Cl.
*G08B 23/00* (2006.01)
*A01K 11/00* (2006.01)
*A01K 29/00* (2006.01)

(52) U.S. Cl.
CPC .......... *A01K 11/006* (2013.01); *A01K 29/005* (2013.01)

(58) Field of Classification Search
CPC ............................. A01K 11/006; A01K 29/005
USPC ...................................................... 340/573.1
See application file for complete search history.

(56) References Cited

U.S. PATENT DOCUMENTS

| | | | | |
|---|---|---|---|---|
| 2003/0229452 | A1* | 12/2003 | Lewis | G16H 10/60 702/19 |
| 2012/0109695 | A1* | 5/2012 | Forkhamer | G06Q 10/02 705/5 |
| 2017/0330295 | A1* | 11/2017 | Alden | G06F 19/3418 |

* cited by examiner

*Primary Examiner* — Tanmay K Shah
(74) *Attorney, Agent, or Firm* — C. John Brannon; Brannon Sowers & Cracraft PC (57) ABSTRACT

A system and method for verifying information relating to pets or support animals use steps of transmitting pet or support animal documentation from a sending user to a third party, verifying the documentation by the third party, resulting in a verified or unverified identifier, and storing a record corresponding to the documentation and the verified or unverified identifier in a data repository. Also facilitated are steps of requesting the verified or unverified identifier corresponding to the documentation by a recipient user using an end user device, querying the data repository for the record and selecting the corresponding verified or unverified identifier, accessing the verified or unverified identifier by the recipient user using the end user device, and determining whether a corresponding pet or support animal meets documentation criteria required by the recipient user based on the verified or unverified identifier.

20 Claims, 5 Drawing Sheets

VERIFICATION PROCESS AND SYSTEM FOR INFORMATION RELATING TO PETS OR SUPPORT ANIMALS

CROSS-REFERENCE TO RELATED APPLICATIONS

This patent application claims priority to U.S. Provisional Patent Application Ser. No. 62/684,245, filed on Jun. 13, 2018.

BACKGROUND

Certain tasks involving an animal, such as traveling, gaining access to establishments, moving into a new residence, and the like may require gathering information regarding animal traits, proof of vaccination, liability waivers, training records, veterinary notes, healthcare provider notes, and the like to present upon request. Understanding the information requirements for the verification process may often be cumbersome and confusing. Even for the requesting business or entity, acquisition and processing such information may be tedious and time consuming, and such information is frequently difficult to verify. Moreover, there is currently no centralized location or process for the submission of such information for third party verification.

For instance, recent inflight animal incidents have led airlines to develop more stringent animal boarding criteria for pets, service animals, support animals, and emotional support animals. The FAA and CDC provide general guidance, but the individual airlines have the ultimate authority for the determination of animal boarding criteria. Therefore, most airlines have widely varying animal boarding criteria, and the airline-to-airline variance in these requirements can be difficult for even a seasoned traveler to follow. For the airlines, verifying that animals and their owners meet the boarding criteria requires extensive man power, and because such policies are detailed and subject to frequent revision not all boarding agents or information verifiers are fully up to speed regarding the details of their airline's current animal policies. Thus, there remains a need for an improved means for storing, verifying, and communicating animal information. The present novel technology addresses this need.

SUMMARY

According to an aspect of the present disclosure, a system and method for verifying information relating to pets or support animals use steps of transmitting pet or support animal documentation from a sending user to a third party, verifying the documentation by the third party, resulting in a verified or unverified identifier, and storing a record corresponding to the documentation and the verified or unverified identifier in a data repository. Also facilitated are steps of requesting the verified or unverified identifier corresponding to the documentation by a recipient user using an end user device, querying the data repository for the record and selecting the corresponding verified or unverified identifier, accessing the verified or unverified identifier by the recipient user using the end user device, and determining whether a corresponding pet or support animal meets documentation criteria required by the recipient user based on the verified or unverified identifier.

DETAILED DESCRIPTION

Before the present methods, implementations, and systems are disclosed and described, it is to be understood that this invention is not limited to specific implementations, and as such may, of course, vary. It is also to be understood that the terminology used herein is for the purpose of describing particular implementations only and is not intended to be limiting.

As used in the specification and the claims, the singular forms "a," "an" and "the" include plural references unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often occur or often not occur, and that the description includes instances where said event or circumstance occurs and instances where it does not. Additionally, "generates," "populates," "generating," and "populating" mean that the animal information verification system 105 of the present disclosure, client, end user (user, system user, email sender, email recipient), and/or module may produce some event or cause some event element to be produced. For example, a webpage may receive data to display in whole or in part to a list of subscriptions to which the end user has or the webpage may pull such data from a source other than the animal information verification system 105 (e.g., other servers, intermediaries, etc.), the webpage may pull such data from a source other than the animal information verification system 105 (e.g., other servers, intermediaries, etc.), and/or the like.

Figure 1:
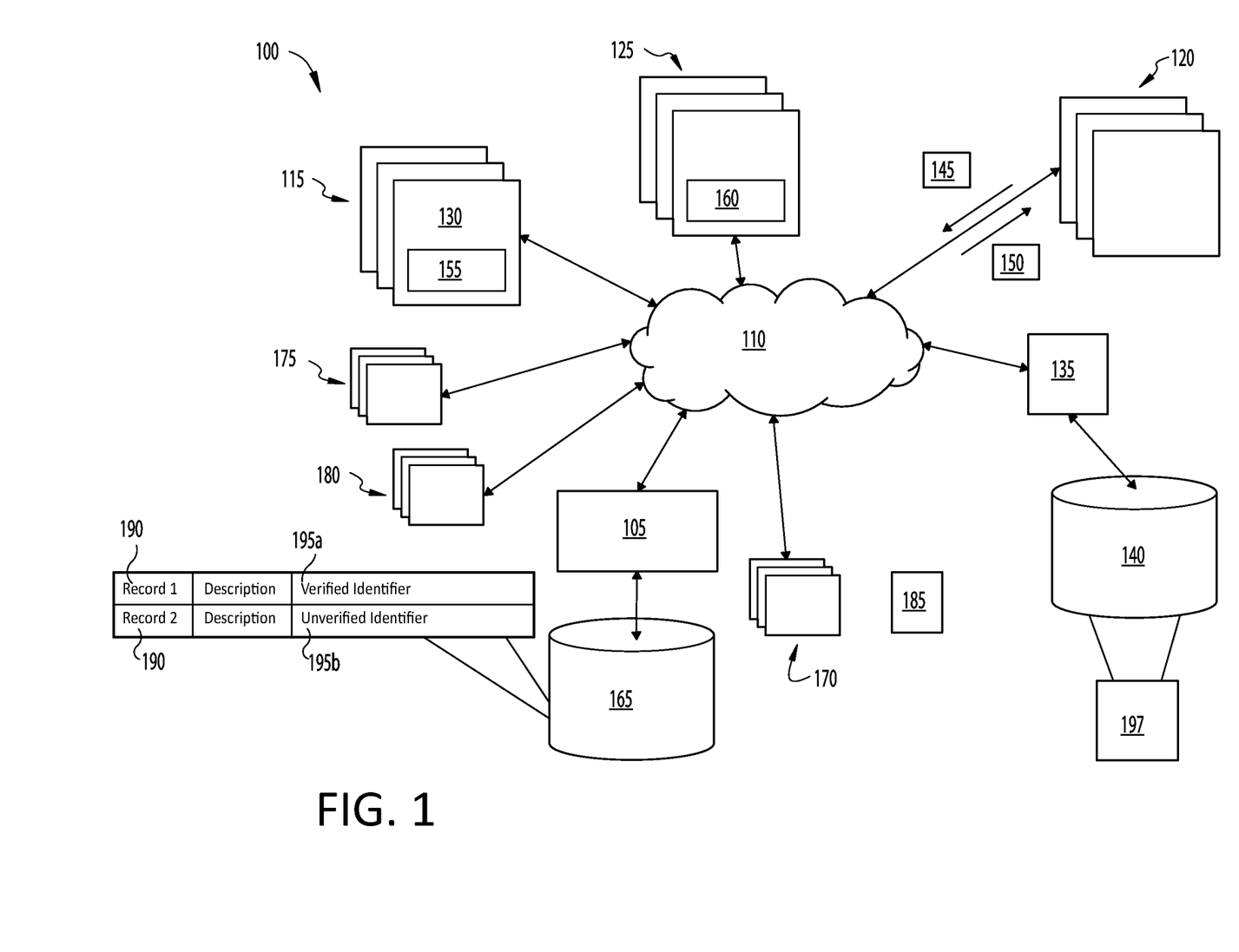
FIG. 1 shows a block diagram of an environment for an animal information verification system, according to an aspect of the present disclosure.

FIG. 1 is a block diagram of an example environment 100 in which animal information verification system 105 may exist. Environment 100 may typically include animal information verification system 105; network 110; website(s) 115; end user device(s) 120; search system 135; search index 140; queries 145; search result(s) 150; system database(s) 165; sending user(s) 170, and/or recipient user(s) 175; third parties 180; pet or support animal documentation 185; records 190. Animal information verification system 105 typically may facilitate transfer of verified information regarding pets or support animals between animal owners (sending users 170) and individuals, businesses, and/or institutions in need of such verified information (recipient users 175).

Example environment 100 also includes network 110, such as a local area network (LAN), a wide area network (WAN), the Internet, the Cloud, or a combination thereof. Network 110 may connect websites 115, end user device(s) 120, and/or animal information verification system 105. Example environment 100 may potentially include many thousands of website(s) 115 and/or end user device(s) 120.

Animal information verification system 105 collects verification information regarding one or more animals belonging to a sending user 170. These animals may be support animals, emotional support animals, comfort animals, assistance animals, pets, and/or the like, and the collected information may also include information about the owner/sending user 170. This information is independently verified by a third party 180 and stored in a system database 165. This information is then available to a recipient user 175, such as an airline. The airline 175 may query 145 the system 105 for specific search results 150 as to whether the pet owner's 170 verified information satisfies criteria 155 as defined by the airline 175. The information may be organized such that the airline 170 simply receives a yes or no answer regarding whether its criteria 155 are met.

Website(s) 115 may be one or more resources 130 associated with a domain name and hosted by one or more servers. An example website(s) 115 may be a collection of webpages formatted in hypertext markup language (HTML) that may contain text, images, multimedia content, and programming elements, such as scripts. Each website(s) 115 may be maintained by a publisher, which may be an entity that controls, manages, and/or owns each website(s) 115.

Resource(s) 130 may be any data that may be provided over the network 110. A resource(s) 130 may be identified by a resource address (e.g., a URL) that may be associated with the resource(s) 130. Resources 130 include HTML webpages, word processing documents, and portable document format (PDF) documents, images, video, and feed sources, to name only a few. Resources 130 may include content, such as words, phrases, images and sounds, that may include embedded information—such as meta-information in hyperlinks—and/or embedded instructions, such as JAVASCRIPT scripts (JAVASCRIPT is a registered trademark of Sun Microsystems, Inc., a Delaware corporation, located at 4150 Network Circle Santa Clara, Calif. 95054). Units of content—for example, data files, scripts, content files, or other digital data—that may be presented in (or with) resources 130 may be referred to as content items. Resource(s) 130 and/or website(s) 115 may, for example, be used to provide sets of criteria 155 a recipient user 175 may require prior to accepting a sending user's 170 animal.

End user devices 120 may be electronic devices that may be under the control of an end user, such as a sending user 170 and/or recipient user 175, and may be capable of requesting and receiving resources 130 over network 110. Example end user devices 120 include personal computers, mobile communication devices, RFID tags, and other devices that may send and/or receive data over network 110. End user devices 120 typically include a user application, such as a web browser, to facilitate the sending and receiving of data over the network 110.

In some implementations, websites 115 (apps, client services; hereinafter simply "websites" for ease of use), end user devices 120, sending user(s) 170, recipient user(s) 175, third parties 180, and/or system 105 may directly intercommunicate, excluding the need for the Internet from the scope of a network 110. For example, the websites 115, end user devices 120, and the animal information verification system 105 may directly communicate over device-to-device (D2D) communication protocols (e.g., WI-FI DIRECT (WI-FI DIRECT is a registered trademark of Wi-Fi Alliance, a California corporation, located at 10900-B Stonelake Boulevard, Suite 126, Austin, Tex. 78759); Long Term Evolution (LTE) D2D (LTE is a registered trademark of Institut Européen des Normes; a French nonprofit telecommunication association, located at 650 route des Lucioles, F-06921, Sophia Antipolis, France), LTE Advanced (LTE-A) D2D, etc.), wireless wide area networks, and/or satellite links thus eliminate the need for the network 110 entirely. In other implementations, websites 115, end user devices 120, sending user(s) 170, recipient user(s) 175, and/or system 105 may communicate indirectly to the exclusion of the Internet from the scope of the network 110 by communicating over wireless wide area networks and/or satellite links.

Further, end user devices 120 may similarly send and receive search queries 145 and search results 150 indirectly or directly. End user devices 120 typically may be used by sending user(s) 170, recipient user(s) 175, third parties 180, and/or other entities to communicate, process data, and/or perform a plurality of other functions. Within the context of system 105, sending user(s) 170 typically may be users that send email data streams (e.g., subscriptions, newsletters, and/or the like), and recipient user(s) 175 typically may be users that receive those email data streams. Recipient user(s) 175 typically may receive those email data streams at one or more mailboxes 160 located directly and/or indirectly on one or more mailbox provider(s) 125.

In wireless wide area networks, communication primarily occurs through the transmission of radio signals over analog, digital cellular, or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM) (GSM is a registered trademark of GSM MoU Association, a Swiss association, located at Third Floor Block 2, Deansgrande Business Park, Deansgrande, Co Dublin, Ireland), Third Generation (wideband or 3G), Fourth Generation (broadband or 4G), personal digital cellular (PDC), or through packet-data technology over analog systems such as cellular digital packet data (CDPD) used on the Advance Mobile Phone System (AMPS).

The terms "wireless application protocol" and/or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Sun Microsystems, Inc. of Santa Clara, Calif.), BREW (BREW is a registered trademark of Qualcomm Incorporated of San Diego, Calif.), WINDOWS Mobile (WINDOWS is a registered trademark of Microsoft Corporation of Redmond, Wash.), PALM OS (PALM is a registered trademark of Palm, Inc. of Sunnyvale, Calif.), SYMBIAN OS (SYMBIAN is a registered trademark of Symbian Software Limited Corporation of London, United Kingdom), ANDROID OS (ANDROID is a registered trademark of Google, Inc. of Mountain View, Calif.), and IPHONE OS (IPHONE is a registered trademark of Apple, Inc. of Cupertino, Calif.), and WINDOWS PHONE 7 (WINDOWS PHONE is a registered trademark the Microsoft Corporation of Redmond, Wash.). "Mobile Apps" refers to software programs written for execution with Mobile Software.

The animal information verification system 105 may use one or more modules to perform various functions including, but not limited to, searching, analyzing, querying, interfacing, etc. A "module" refers to a portion of a computer system and/or software program that carries out one or more specific functions and may be used alone or combined with other modules of the same system or program. For example, a module may be located on the animal information verification system 105 (e.g., on the servers of system 105, i.e., server-side module), on end user devices 120, or on an intermediary device (e.g., the client server, i.e., a client-side module; another end user device(s) 120; a different server on the network 110; or any other machine capable of direct or indirect communication with system 105, websites 115, the search system 135, and/or the end user devices 120.)

In some implementations, the system 105 may be performed through a system 105 module. For example, a user may install a program to interface with a system 105 server to communicate data, interactions, and animal information to/from the user's end user device(s) 120. In some other implementations, the system 105 may be installed on a user's machine and operate—in whole or in part—independently of system 105 WAN and/or LAN components. For example, the system 105 software may be deployed to a user's computer as a standalone program that interfaces with the user's computer, creates and maintains data store(s), maintains/processes subscription data, maintains/processes trust linkage data, filters/transfers email, etc.

In another example, the system 105 may interact with and/or be installed as an Internet browser extension. For example, the system 105 may be a program installed as an extension, add-on, and/or plugin of GOGGLE CHROME (GOGGLE CHROME is a registered trademark of Google, Inc., a Delaware corporation, located at 1600 Amphitheatre Parkway, Mountain View, Calif. 94043); MOZILLA FIREFOX (MOZILLA and FIREFOX are registered trademarks of the Mozilla Foundation, a California non-profit corporation, located at 313 East Evelyn Avenue, Mountain View, Calif. 94041); APPLE SAFARI (APPLE and SAFARI are registered trademarks of Apple, Inc., a California corporation, located at 1 Infinite Loop, Cupertino, Calif. 95014), etc. The browser extension may query subscription lists, query/maintain/process trust linkage data, query/maintain/process email, communicate with data store(s), analyze trust linkage data, and communicate with third-party servers.

Typically, modules may be coded in JAVASCRIPT, PHP, or HTML, but may be created using any known programming language (e.g., BASIC, FORTRAN, C, C++, C#, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, the animal information verification system 105 may be packaged, distributed, scripted, installed by a technician of system 105, and/or otherwise deployed to a client server location such that system 105 exists within the client server and/or client server network, either in whole or in part. For example, the animal information verification system 105 may be scripted and/or packaged into an executable package and downloaded by a client administrator; the client administrator then installing system 105 software package(s) onto the client server(s). Such setups may allow the animal information verification system 105 to operate all system 105 operations entirely within the client server(s) and/or client network, excluding the need to interface with system 105 provider's servers for some or all system 105 functions. Such an implementation may, for example, be used to reduce bandwidth, latency, complexity of network management, etc. In some other implementations, the client servers may facilitate only some of system 105 functions and interface with system 105 servers (over a network or directly) to enable those remaining functions. Still other implementations may link to system 105 servers to obtain updates, patches, and/or other modifications to system 105 distributions.

Animal information verification system 105 software distributions may, in some implementations, be installed in a virtual environment (e.g., HYPER-V (HYPER-V is a registered trademark of Microsoft, a Washington Corporation, located at One Microsoft Way, Redmond, Wash. 98052); VIRTUALBOX (VIRTUALBOX is a registered trademark of Oracle America, Inc., a Delaware corporation, located at 500 Oracle Parkway, Redwood Shores, Calif. 94065); VMWARE (VMWARE is a registered trademark of VMWare, Inc., a Delaware corporation, located at 3401 Hillview Ave., Palo Alto, Calif. 94304), etc.).

In other implementations, animal information verification system 105 software may be installed in whole or in part on an intermediary system that may be separate from the client and system 105 servers. For example, animal information verification system 105 software may be installed by an intermediary worker, a client worker, and/or a system 105 worker onto a hosting service (e.g., AMAZON WEB SERVICES (AWS) (AWS is a registered trademark of Amazon Technologies, Inc., a Nevada corporation, located at PO Box 8102, Reno, Nev. 89507), RACKSPACE (RACKSPACE is a registered trademark of Rackspace US, Inc., a Delaware corporation, located at 1 Fanatical Place, City of Windcrest, San Antonio, Tex. 78218), etc. The client may then connect to the intermediary and/or system 105 servers to access system 105 functions. Such implementations may, for example, allow distributed access, redundancy, decreased latency, etc.

End user device(s) 120 may request resources 130 from website(s) 115. In turn, data representing resource(s) 130 may be provided to end user device(s) 120 for presentation by end user device(s) 120. Data representing resource(s) 130 may also include data specifying a portion of the resource(s) 130 or a portion of a user display—for example, a small search text box or a presentation location of a pop-up window—in which advertisements or third-party search tools may be presented.

To facilitate searching of resource(s) 130, environment 100 may include a search system 135 that identifies resource(s) 130 by crawling and indexing resource(s) 130 provided by publishers on website(s) 115. Data about resource(s) 130 may be indexed based on resource(s) 130 to which the data corresponds. The indexed and, optionally, cached copies 197 of resource(s) 130 may be stored in, for example, search index 140.

End user device(s) 120 may submit search queries 145 to search system 135 over network 110. In response, search system 135 accesses search index 140 to identify resource(s) 130 that may be relevant to search query 145. Search system 135 identifies the resources 130 in the form of search result(s) 150 and returns the search result(s) 150 to end user devices 120 in search results webpages. A search result(s) 150 may be data generated by the search system 135 that identifies a resource(s) 130 that may be responsive to a particular search query, and includes a link to the resource(s) 130. An example search result(s) 150 may include a webpage title, a snippet of text or a portion of an image extracted from the webpage, and the URL of the webpage.

Users that may be interested in a particular subject may perform a search by submitting one or more queries 145 to search system 135 in an effort to identify related information. For example, a user that may be interested in support animals may submit queries 145 such as "support animal", "comfort animal," or "animal transportation criteria". In response to each of these queries 145, the user may be provided search result(s) 150 that have been identified as responsive to the search query—that is, have at least a minimum threshold relevance to the search query, for example, based on cosine similarity measures or clustering techniques. The user may then select one or more of the search result(s) 150 to request presentation of a webpage or other resource(s) 130 that may be referenced by a URL associated with the search result(s) 150.

Other implementations of the animal information verification system 105 may allow for a game-like components, or gamification, aspect to interaction with system 105. For example, tangible (e.g., money, goods, etc.) and/or intangible (e.g., account badges, user name flair, etc.) rewards may be given to users who frequently interact with system 105, users who have activated certain thresholds of subscriptions on system 105, etc.

When search result(s) 150 are requested by an end user device(s) 120, the animal information verification system 105 may receive a request for data to be provided with the resource(s) 130 or search results 150. In response to the request, the animal information verification system 105 selects data that are determined to be relevant to the search query. In turn, the selected data are provided to the end user device(s) 120 for presentation with the search results 150.

For example, in response to the search query "airline support animals" system 105 may present the user 175 with relevant airline support animal-related results. If the user selects—for example, by clicking or touching—search result(s) 150, the end user device(s) 120 may be redirected, for example, to a webpage containing one or more airline-specific support animal boarding criteria 155 lists that a user 175 may consult to verify that a specific sending user's 170 animal is qualified to board.

The environment 100 may also include a system database(s) 165 to receive and record information regarding the animal information verification system 105, website(s) 115, end user devices 120, and/or any other data useful to environment 100. For example, information regarding end user devices 120 and end user identifiers may be stored and analyzed to determine user activity on website(s) 115 and/or system 105.

Figure 2:
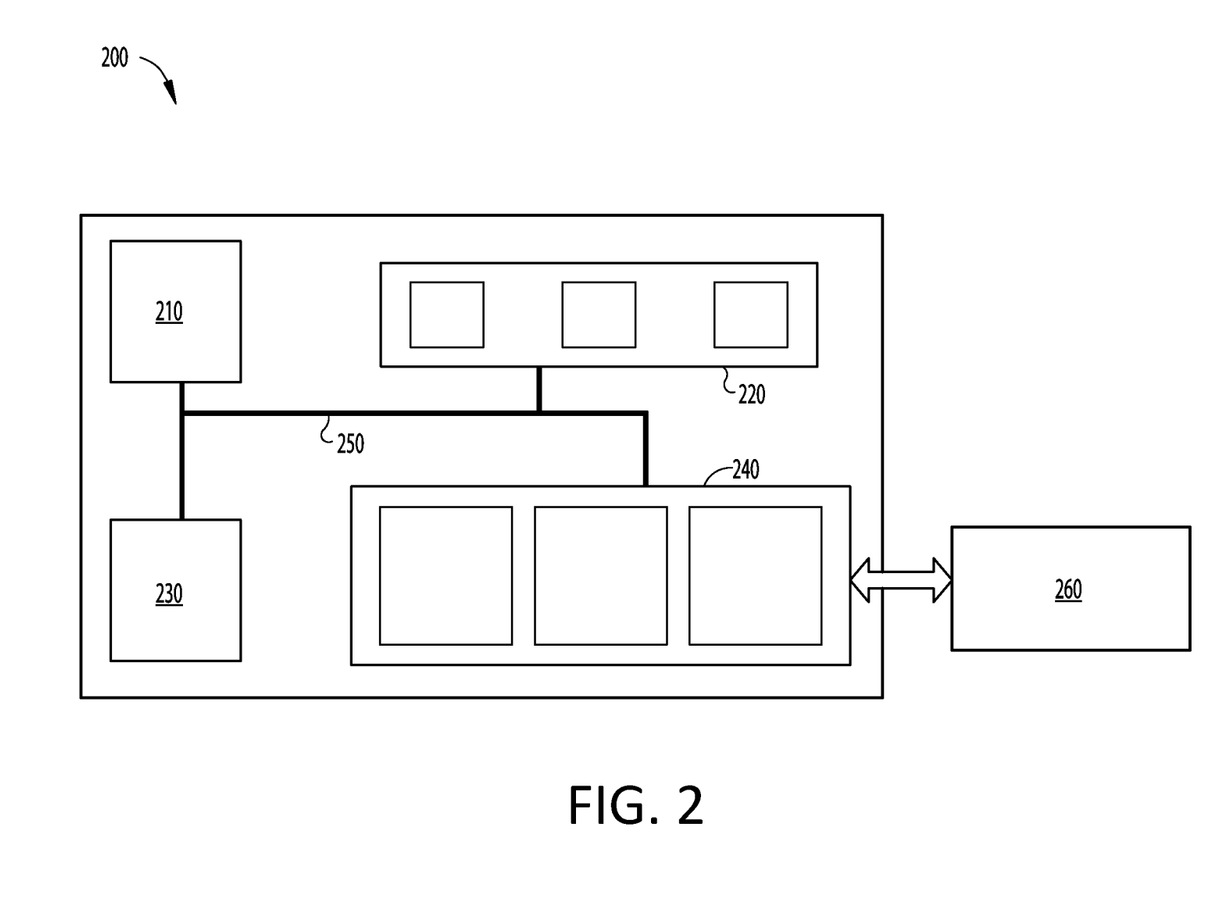
FIG. 2 shows a simplified diagram of a computer system for implementation in the environment of FIG. 1, according to another aspect of the present disclosure.

FIG. 2 is a block diagram of an example computer system 200 that may be used to provide animal information verification system 105, as described above. The computer system 200 may typically include processor(s) 210; memory 220; storage device(s) 230; system input(s)/output(s) 240; system bus(es) 250; and input/output device(s) 260. Each of the components 210, 220, 230, and 240 typically may be interconnected, for example, using system bus(es) 250. Processor(s) 210 may be capable of processing instructions for execution within the system 200. In one implementation, processor(s) 210 may be a single-threaded processor. In another implementation, processor(s) 210 may be a multi-threaded processor. In yet another implementation, processor(s) 210 may be a single-core processor, a multiple-core processor, and/or multiple processors (i.e., more than one socketed processor). Processor(s) 210 typically may be capable of processing instructions stored in the memory 220 and/or on the storage device(s) 230.

Memory 220 stores information within system 200. In one implementation, memory 220 may be a computer-readable medium. In one other implementation, memory 220 may be a volatile memory unit. In another implementation, memory 220 may be a nonvolatile memory unit.

Storage device(s) 230 may be capable of providing mass storage for the system 200. In one implementation, storage device(s) 230 may be a computer-readable medium. In various different implementations, storage device(s) 230 may include, for example, a hard disk device, a solid-state disk device, an optical disk device, and/or some other large capacity storage device.

System input(s)/output(s) 240 provide input/output operations for the system 200. In one implementation, system input(s)/output(s) 240 may include one or more of a network interface devices, for example an Ethernet card; a serial communication device, for example an RS-232 port; and/or a wireless interface device, for example an IEEE 802.11 card. In another implementation, system input(s)/output(s) 240 may include driver devices configured to receive input data and send output data to other input/output device(s) 260, for example keyboards, printers, display devices, and/or any other input/output device(s) 260. Other implementations, however, may also be used, such as mobile computing devices, mobile communication devices, set-top box television client devices, etc.

Although an example processing system has been described, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium may not be a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, for example an field programmable gate array (FPGA) or an application-specific integrated circuit (ASIC). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a computer are a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk read-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, Wash. 98052), IPOD (IPOD is a registered trademark of Apple Inc., a California corporation, located at 1 Infinite Loop, Cupertino, Calif. 95014), XBOX (e.g., XBOX, XBOX ONE) (XBOX and XBOX ONE are a registered trademarks of Microsoft, a Washington corporation, located at One Microsoft Way, Redmond, Wash. 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, Calif. 90949), WII (e.g., WII, WII U) (WII and WII U are registered trademarks of Nintendo of America Inc., a Washington corporation, located at 4600 150th Avenue NE, Redmond, Wash. 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that may be used by the user; for example, by sending webpages to a web browser on a user's client device in response to requests received from the web browser.

Some embodiments of the subject matter described in this specification may be implemented in a computing system 200 that includes a back-end component (e.g., a data server,) or that includes a middleware component (e.g., an application server,) or that includes a front-end component (e.g., a client computer having a graphical user interface or a Web browser through which a user may interact with an implementation of the subject matter described in this specification) or any combination of one or more such back-end, middleware, or front-end components. The components of the computing system 200 may be interconnected by any form or medium of digital data communication, for example a communication network. Examples of communication networks include a local area network (LAN) and a wide area network (WAN), an inter-network (e.g., the Internet), and peer-to-peer networks (e.g., ad-hoc peer-to-peer, direct peer-to-peer, decentralized peer-to-peer, centralized peer-to-peer, etc.).

The computing system 200 may include clients and servers. A client and server are typically remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

In addition to providing businesses 175 with reliable verification, and customers 170 with a tangible means 120 of proving which requirements have been met, the system 105 provides many additional benefits. This company can eliminate a participating business's burden of verifying and processing animal related information; subsequently decreasing the amount of personnel, work hours, and financial investment involved in verifying animal related information. This company can provide objective, improved quality of verification due to the company's verifiers being a third party and being trained to verify pertinent documents. In addition, verifiers would likely review a higher volume of documents increasing their familiarity and accuracy. The website, mobile phone application, and RFID decrease paper burden for customers and participating businesses. Customers can utilize the mobile phone application to ensure all business requirements have been met prior to arriving at the respective business. By creating a centralized location for verification, customers could potentially gain access or meet the requirements of several different businesses by providing their information to one service.

There are countless situations wherein the system 105 may be applied. For an example, a prospective apartment lessor 175 does not allow animals in the apartment complex unless it's a support animal or an emotional support animal with proper documentation. The prospective lessee 170 has a health care provider note supporting the need for an emotional support animal to reside with him in the apartment. Because they desire reliable third-party verification, the lessor 175 utilizes the system 105 to provide verification services. The prospective lessee 170 electronically creates an account and submits their healthcare provider note to the system 105 HIPAA compliant database 165. The system's 105 trained verifiers review the note and verify all required information is present.

In this situation, verification would relate to numerous requirements, such as confirming the note is written on letterhead, confirming the patient's name matches the name on the customer account, verifying a date is present and within the required timeframe for use, verifying the note contains an active, valid license number, verifying the license number on the note belongs to the health care provider that wrote the note, verifying the state of issue of the license is written on the document and corresponds to the state of issue of the license number, verifying proper healthcare provider taxonomy, verifying the note states the customer has a disability recognized in the current Diagnostic and Statistical Manual of Mental Disorders (DSM), verifying the note states the customer has a need for the Emotional Support animal, and verifying the note contains a healthcare provider signature. If there are discrepancies the customer 170 would be notified, but if all required items were present the customer 170 would receive direct online verification and their RFID card 120, updated by the system 105, would reflect this when scanned by the mobile phone application. When the lessor 175 scans the prospective lessee's RFID 120 they will receive immediate confirmation that the prospective lessee 170 has the appropriate documentation. Because of this streamlined verification process, there is no need to bring paperwork to the leasing office, and no need for the lessor to review the healthcare provider note and online provider registries; decreasing time, presumably improving verification accuracy, and increasing privacy of the lessor's health related information.

Figure 3:
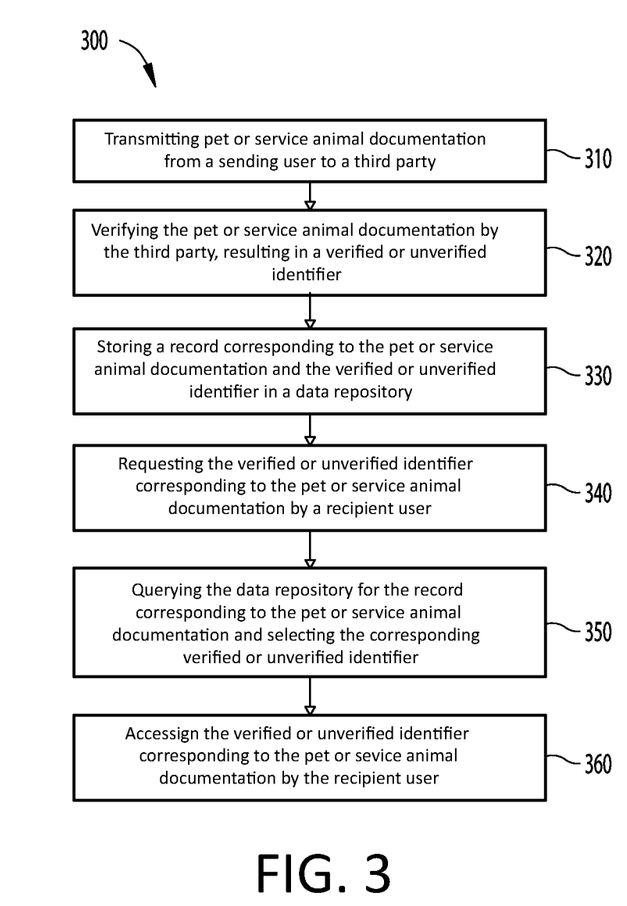
FIG. 3 shows a method of verifying information relating to pets or support animals using the animal information verification system and environment of FIG. 1, according to another aspect of the present disclosure.

FIG. 3 depicts a process flow chart 300 associated with the use of the animal information verification system 105. According to one use, as facilitated by the animal information verification system 105, information relating to pets or support animals may be verified, stored, and easily accessed by users. For example, a sending user 170 may have a desire to engage in certain tasks involving an animal, such as traveling, gaining access to establishments, moving into a new residence, and the like. The sending user 170 may create an account on the animal information verification system 105 by accessing the system 105 using an end user device 120, such as, for example, by accessing a website 115. It should be appreciated, however, that various system architectures and configurations may be used to implement the animal information verification system 105. Thus, creating accounts, among other tasks, may be accomplished in a variety of different ways.

Having an account on the animal information verification system 105, the sending user 170 may transmit or submit pet or support animal documentation 185 for verification, at step 310. The pet or support animal documentation 185 may include, for example, information regarding animal traits, vaccination records, liability waivers, training records, veterinary notes, and healthcare provider notes. This documentation 185 may be transmitted electronically via the animal information verification system 105, such as by using an end user device 120, or may be transmitted using other means for verification, with records 190 of the pet or support animal documentation 185 being stored in a data repository, such as the system database 165.

At a second step 320, the pet or support animal documentation 185 may be verified by a third party 180. According to one embodiment, the third party 180 may be a company capable of objective and high-quality verification that is trained in verifying pet or support animal documentation 185. As stated above, verification might relate to numerous requirements, such as confirming the note is written on letterhead, confirming the patient's name matches the name on the customer account, verifying a date is present and within the required timeframe for use, verifying the note contains an active, valid license number, verifying the license number on the note belongs to the health care provider that wrote the note, verifying the state of issue of the license is written on the document and corresponds to the state of issue of the license number, verifying proper healthcare provider taxonomy, verifying the note states the customer has a disability recognized in the current Diagnostic and Statistical Manual of Mental Disorders (DSM), verifying the note states the customer has a need for the Emotional Support animal, and verifying the note contains a healthcare provider signature.

As a result of the verification, the third party 180 may determine whether the pet or support animal documentation 185 is verified or unverified. This may result in the creation of a verified identifier 195a or an unverified identifier 195b, or other electronic tags. A record 190 corresponding to the pet or support animal documentation 185 may be created or updated with the appropriate verified identifier 195a or unverified identifier 195b and stored in the system database 165, at a third step 330. If there are discrepancies with the pet or support animal documentation 185, the sending user 170 could be notified electronically or by other means. If the pet or support animal documentation 185 is successfully verified, the sending user 170 could receive direct online verification. For sending users 170 using an RFID card or tag, the RFID card could be updated by the animal information verification system 105.

At step 340, the verified identifier 195a or the unverified identifier 195b corresponding to the pet or support animal documentation 185 may be requested by a recipient user 175, such as by using an end user device 120. The recipient user 175 may be any party, such as, for example, an airline or a lessor, having a need or interest for pet or support animal documentation 185. The recipient user 175 may also have an account on the animal information verification system 105 and may have access via an end user device 170. For example, the recipient user 175 may use a mobile phone application of an end user device 170 to scan an RFID card of the sending user 170 to receive confirmation of verified pet or support animal documentation 185.

In response to the request for pet or support animal documentation 185, the data repository 165 may be queried for records 190 corresponding to the required pet or support animal documentation 185 and the corresponding verified identifier 195a or unverified identifier 195b. Recipient users 175 may have one piece of pet or support animal documentation 185 or multiple pieces of pet or support animal documentation 185 and may require verification of each piece of documentation 185. The records 190 may be indexed or catalogued in the system database 165 for easier and quicker access.

At step 360, the verified identifier 195a or the unverified identifier 195b corresponding to the pet or support animal documentation 185 requested by the recipient user 175 is accessed by the recipient user 175. The information may be accessed using an end user device 120, such as, for example, by using a mobile phone application to scan the RFID card of the sending user 170. Various other methods, such as those described above with respect to the animal information verification system 105, may be used to access the verified identifier 195a or the unverified identifier 195b corresponding to the pet or support animal documentation 185. It may then be determined by the recipient user 175 whether a corresponding pet or support animal meets the documentation criteria 155 required by the recipient user 175.

Figure 4:
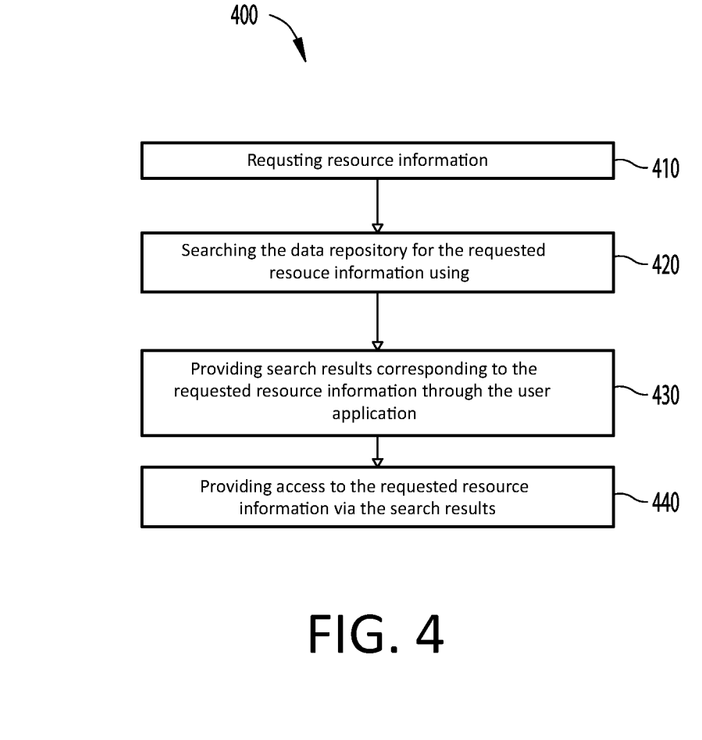
FIG. 4 shows a method of requesting resource information through the animal information verification system and environment of FIG. 1, according to another aspect of the present disclosure.

FIG. 4 depicts another process flow chart 400 associated with the use of the animal information verification system 105. According to another use, resource information 130 may be accessed using the animal information verification system 105 via an end user device 120.

At step 410, resource information 130 may be requested through the animal information verification system 105 using an end user device 120. As stated above, users, such as sending users 170, that may be interested in a particular subject may perform a search via an end user device 120 by submitting one or more queries 145 to search system 135 to identify related information. For example, a user that may be interested in support animals may submit queries 145 such as "support animal", or "comfort animal." Those wanting information regarding documentation that is required to travel with their pet or support animal may search "animal transportation criteria."

In response, at step 420, the search system 135 may access search index 140 to identify resource(s) 130 that may be relevant to search query 145. Search system 135 identifies the resources 130 in the form of search result(s) 150 and returns the search result(s) 150 to end user devices 120 in search results webpages. A search result(s) 150 may be data generated by the search system 135 that identifies a resource(s) 130 that may be responsive to a particular search query, and includes a link to the resource(s) 130. An example search result(s) 150 may include a webpage title, a snippet of text or a portion of an image extracted from the webpage, and the URL of the webpage. These search result(s) 150 may be displayed to the user through the end user device 120, at step 430.

The user may then select one or more of the search result(s) 150, at step 440, to request presentation of a webpage or other resource(s) 130 that may be referenced by a URL associated with the search result(s) 150.

Figure 5:
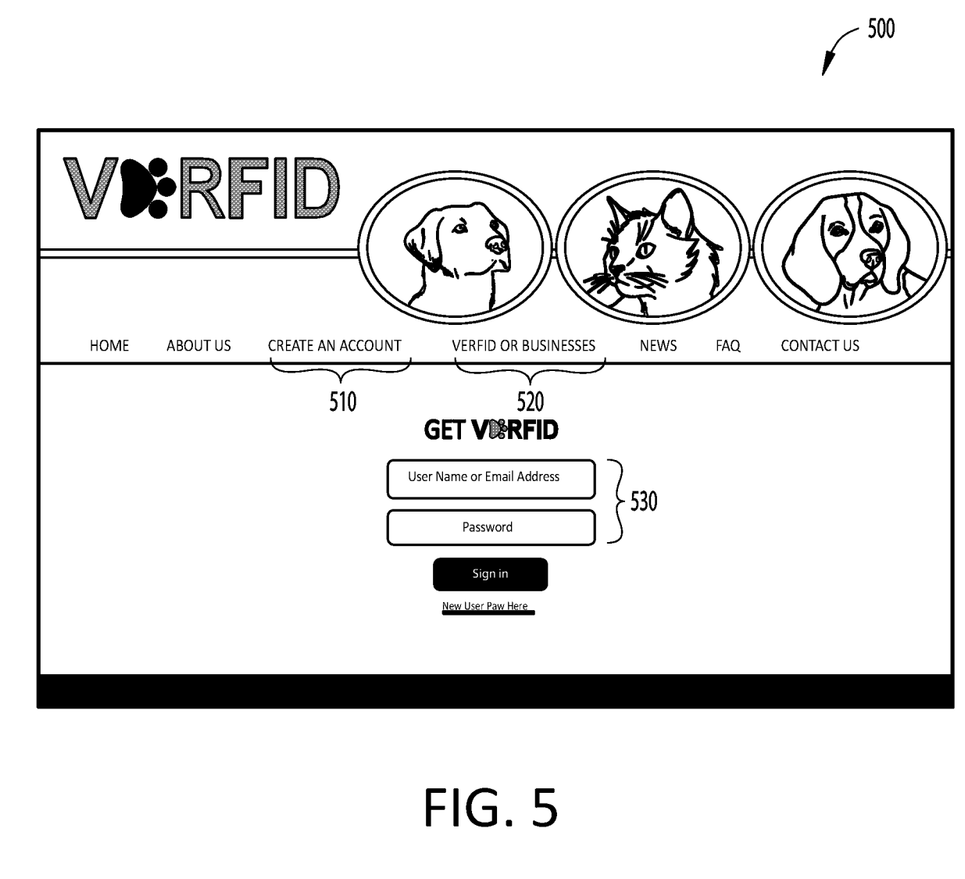
FIG. 5 shows an exemplary webpage interfacing with the animal information verification system of FIG. 1, according to another aspect of the present disclosure.

FIG. 5 shows an exemplary webpage 500 interfacing with the animal information verification system 105. The webpage 500 may be the home page of a website 115, which may be a user application running on an end user device 120, that facilitates communication with the animal information verification system 105. The end user device 120 may be a personal computer or a mobile communication device, for example.

Via the website 115 a sending user 170 or a recipient user 175, or other users, may create an account (such as by selecting link 510) on the animal information verification system 105 or view information about the system 105 or access a business portal (such as by selecting link 520). The sending user 170 or recipient user 175, or other users, may also log in to an existing account by entering credentials in area 530. By logging into their account, users may have access to carry out the tasks described herein related to the animal information verification system 105.

Figure 6:
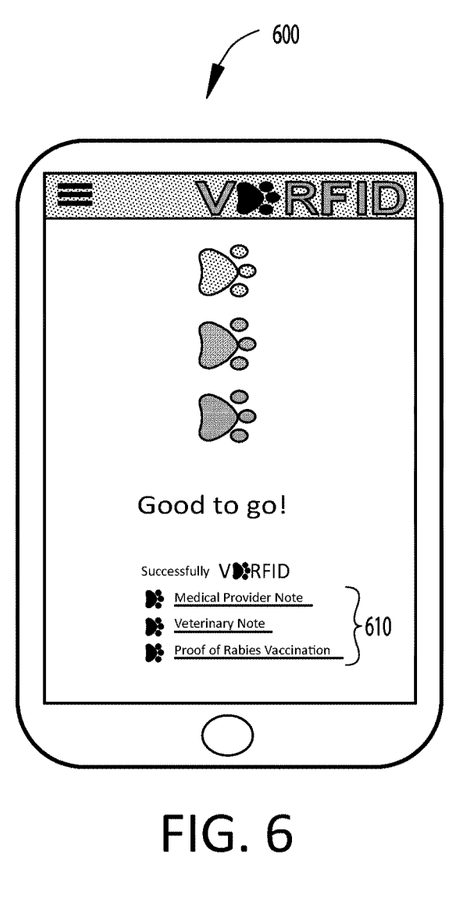
FIG. 6 shows a first exemplary app screen interfacing with the animal information verification system of FIG. 1, according to another aspect of the present disclosure.

FIG. 6 shows a first exemplary app screen 600 interfacing with the animal information verification system 105. The app screen 600 may be a page of a mobile phone application, which may be a user application running on an end user device 120, such as a mobile phone or mobile communication device, to facilitate communication with the animal information verification system 105. According to some embodiments, a recipient user 175 may utilize the end user device 120 to access records 190 corresponding to the required pet or support animal documentation 185 and the corresponding verified identifier 195a or unverified identifier 195b. According to one example, the results may be displayed as shown in FIG. 6, with verified documentation being presented in area 610 of the app screen 600.

Figure 7:
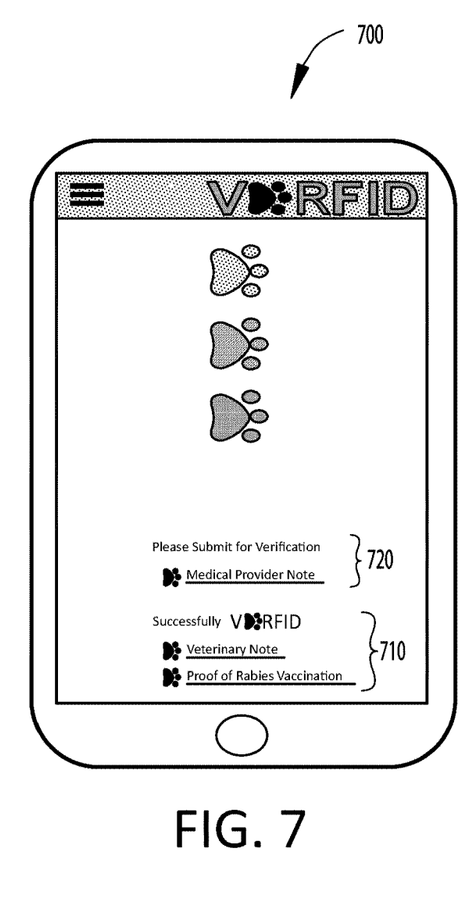
FIG. 7 shows a second exemplary app screen interfacing with the animal information verification system of FIG. 1, according to another aspect of the present disclosure.
Figure 8:
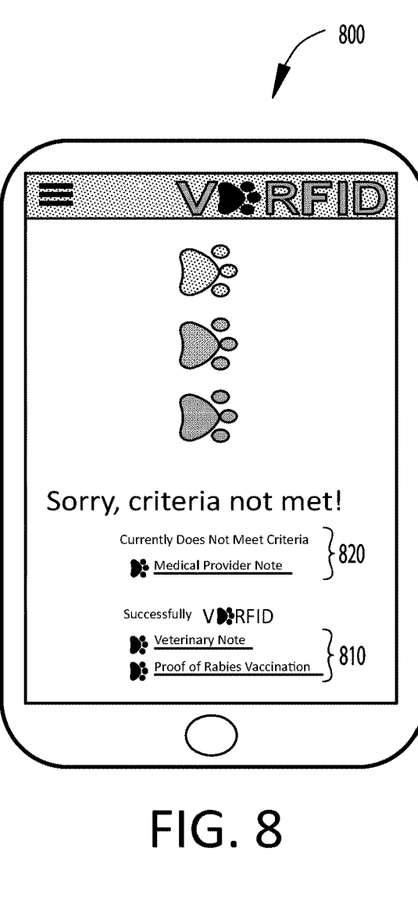
FIG. 8 shows a third exemplary app screen interfacing with the animal information verification system of FIG. 1, according to another aspect of the present disclosure.

FIG. 7 shows a second exemplary app screen 700 interfacing with the animal information verification system 105. This app screen 700 depicts verified documentation in area 710 of the app screen 700, while unverified documentation is depicted in area 720 of the app screen 700. In particular, the unverified documentation of area 720 may be requested pet or support animal documentation 185 that has not been submitted by the sending user 170. FIG. 8 shows a third exemplary app screen 800 interfacing with the animal information verification system 105. This app screen 800 depicts verified documentation in area 810 of the app screen 800, while unverified documentation is depicted in area 820 of the app screen 800. The unverified documentation of area 820 may be pet or support animal documentation that has not met the requirements for verification.

The animal information verification system 105 of the present disclosure provides a system and method for receiving, storing, verifying, and providing pet or support animal documentation 185 in a centralized, efficient, and highly accurate manner. The system 105 provides the ability for companies or individuals requiring verified pet or support animal documentation 185, whether they require one piece of documentation or many, to access that information in a quick and reliable manner. The system 105 also provides a communication platform and search capabilities for efficiently searching for and accessing relevant pet or support animal documentation across a network.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. In some circumstances, certain steps, routines, and/or subroutines may be omitted, skipped, repeated, and/or modified to best operate. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method for verifying information relating to pets or support animals using an animal information verification system, including steps of:
   transmitting pet or support animal documentation relating to a specific pet or support animal from a sending user to a third party, wherein the pet or support animal documentation includes a plurality of different documents corresponding to pre-established documentation requirements of a recipient user;
   verifying the pet or support animal documentation by the third party, resulting in a verified identifier or an unverified identifier corresponding to the plurality of different documents of the pet or support animal documentation;
   storing a record corresponding to the pet or support animal documentation and the verified identifier or the unverified identifier in a data repository of the animal information verification system;
   requesting the verified identifier or the unverified identifier corresponding to the pet or support animal documentation for the specific pet or support animal by the recipient user using an end user device;
   in response to the requesting step, querying the data repository for the record corresponding to the pet or support animal documentation for the specific pet or support animal that corresponds to pre-established documentation requirements of the recipient user and selecting the corresponding verified identifier or unverified identifier;
   accessing the verified identifier or the unverified identifier corresponding to the pet or support animal documentation by the recipient user using the end user device; and
   determining whether specific pet or support animal meets pre-established documentation requirements of the recipient user based on the verified identifier or the unverified identifier.

2. The method of claim 1, further including using the end user device by the sending user.

3. The method of claim 2, wherein the end user device includes at least one of a personal computer, a mobile communication device, and an RFID tag.

4. The method of claim 3, wherein the transmitting step is performed using the end user device.

5. The method of claim 3, further including programming the RFID tag with information corresponding to the record that corresponds to the pet or support animal documentation and the verified identifier or the unverified identifier.

6. The method of claim 3, further including providing a user application on the end user device to facilitate sending and receiving data over a network.

7. The method of claim 6, further including: requesting resource information through the animal information verification system using the end user device; searching for the requested resource information; providing search results corresponding to the requested resource information through the user application of the end user device; and providing access to the requested resource information via the search results.

8. The method of claim 7, wherein the resource information includes documentation criteria used by the recipient user to evaluate a pet or support animal.

9. The method of claim 1, wherein the pet or support animal documentation includes at least one of information regarding animal traits, vaccination records, liability waivers, training records, veterinary notes, and healthcare provider notes.

10. An animal information verification system for verifying information relating to pets or support animals, including:
a data repository storing a record corresponding to pet or support animal documentation relating to a specific pet or support animal and a verified identifier or an unverified identifier, wherein the pet or support animal documentation includes a plurality of different documents corresponding to pre-established documentation requirements of a recipient user and is transmitted from a sending user to a third party and verified by the third party; and
a user device used by a recipient user to request the verified identifier or the unverified identifier corresponding to the pet or support animal documentation by the recipient user;
wherein the animal information verification system, in response to the recipient user request, queries the data repository for the record corresponding to the pet or support animal documentation and selects the corresponding verified identifier or unverified identifier;
wherein the verified identifier or the unverified identifier corresponding to the pet or support animal documentation is accessed by the recipient user using the end user device.

11. The animal information verification system of claim 10, wherein the sending user uses the end user device.

12. The animal information verification system of claim 11, wherein the end user device includes at least one of a personal computer, a mobile communication device, and an RFID tag.

13. The animal information verification system of claim 12, wherein the sending user uses the end user device to transmit the pet or support animal documentation from the sending user to the third party.

14. The animal information verification system of claim 12, wherein the RFID tag is programmed with information corresponding to the record that corresponds to the pet or support animal documentation and the verified identifier or the unverified identifier.

15. The animal information verification system of claim 12, wherein the end user device includes a user application to facilitate sending and receiving data over a network.

16. The animal information verification system of claim 15, wherein the user application is a web browser.

17. The animal information verification system of claim 15, further including:
resource information accessible by the animal information verification system;
wherein the end user device is used to request resource information, the animal information verification system is used to search for the requested resource information, the user application is used to provide search results corresponding to the requested resource information, and the search results provide access to the requested resource information.

18. The animal information verification system of claim 17, wherein the resource information includes documentation criteria used by the recipient user to evaluate a pet or support animal.

19. The animal information verification system of claim 10, wherein the pet or support animal documentation includes at least one of information regarding animal traits, vaccination records, liability waivers, training records, veterinary notes, and healthcare provider notes.

20. A method for verifying pet or support animal documentation relating to a specific pet or support animal, including steps of:
verifying the pet or support animal documentation by a third party, resulting in a verified identifier or an unverified identifier;
wherein the pet or support animal documentation includes a plurality of different documents corresponding to pre-established documentation requirements of a recipient user;
requesting the verified identifier or the unverified identifier corresponding to the pet or support animal documentation for the specific pet or support animal by the recipient user using an end user device;
accessing the verified identifier or the unverified identifier corresponding to the pet or support animal documentation by the recipient user using the end user device; and
determining whether specific pet or support animal meets pre-established documentation requirements the recipient user based on the verified identifier or the unverified identifier.

* * * * *